United States Patent
Kano et al.

(10) Patent No.: US 11,142,610 B2
(45) Date of Patent: Oct. 12, 2021

(54) CURABLE EPOXY RESIN COMPOSITION, FIBER-REINFORCED COMPOSITE MATERIAL AND MOLDED BODY USING SAME

(71) Applicant: NIPPON STEEL CHEMICAL & MATERIAL CO., LTD., Tokyo (JP)

(72) Inventors: Kyohei Kano, Tokyo (JP); Yuichi Taniguchi, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 238 days.

(21) Appl. No.: 16/466,895

(22) PCT Filed: Dec. 1, 2017

(86) PCT No.: PCT/JP2017/043324
§ 371 (c)(1),
(2) Date: Jun. 5, 2019

(87) PCT Pub. No.: WO2018/123442
PCT Pub. Date: Jul. 5, 2018

(65) Prior Publication Data
US 2020/0109233 A1    Apr. 9, 2020

(30) Foreign Application Priority Data

Dec. 27, 2016  (JP) .............................. JP2016-253282

(51) Int. Cl.
| | |
|---|---|
| *C08J 5/24* | (2006.01) |
| *C08L 63/00* | (2006.01) |
| *C08G 59/42* | (2006.01) |
| *C08G 59/68* | (2006.01) |
| *C08G 59/24* | (2006.01) |
| *B29C 53/56* | (2006.01) |
| *B29C 70/30* | (2006.01) |
| *B29C 70/52* | (2006.01) |
| *C08G 59/58* | (2006.01) |
| *C08J 5/04* | (2006.01) |
| *C08K 5/00* | (2006.01) |
| *C08K 5/09* | (2006.01) |
| *C08K 5/14* | (2006.01) |
| *C08K 5/3445* | (2006.01) |
| *C08L 47/00* | (2006.01) |

(52) U.S. Cl.
CPC ............ *C08G 59/245* (2013.01); *B29C 53/56* (2013.01); *B29C 70/30* (2013.01); *B29C 70/52* (2013.01); *C08G 59/58* (2013.01); *C08J 5/042* (2013.01); *C08J 5/24* (2013.01); *C08K 5/0025* (2013.01); *C08K 5/09* (2013.01); *C08K 5/14* (2013.01); *C08K 5/3445* (2013.01); *C08L 47/00* (2013.01); *C08J 2363/04* (2013.01)

(58) Field of Classification Search
None
See application file for complete search history.

(56) References Cited

U.S. PATENT DOCUMENTS

| | | | | |
|---|---|---|---|---|
| 4,503,200 A | * | 3/1985 | Corley ................... | C08F 283/10 |
| | | | | 525/529 |
| 4,853,279 A | * | 8/1989 | Shibata ............... | C08F 299/026 |
| | | | | 525/115 |
| 4,954,304 A | * | 9/1990 | Ohtake .................. | B32B 15/14 |
| | | | | 264/137 |
| 5,612,424 A | * | 3/1997 | Sato .................... | C08F 290/062 |
| | | | | 428/320.2 |
| 2006/0035088 A1 | | 2/2006 | Takano et al. | |
| 2012/0259039 A1 | | 10/2012 | Kobayashi et al. | |
| 2019/0055369 A1 | | 2/2019 | Taniguchi et al. | |

FOREIGN PATENT DOCUMENTS

| | | |
|---|---|---|
| JP | 2004-285148 A | 10/2004 |
| JP | 4872139 B2 | 2/2012 |
| JP | 5028903 B2 | 9/2012 |
| JP | 2013-001711 A | 1/2013 |
| JP | 5397265 B2 | 1/2014 |
| JP | 2014-167102 A | 9/2014 |
| JP | 2016-017110 A | 2/2016 |
| WO | 2004/048435 A1 | 6/2004 |

(Continued)

OTHER PUBLICATIONS

International Search Report dated Dec. 26, 2017, issued for PCT/JP2017/043324.
Notification of Transmittal of Copies of Translation of the International Preliminary Report on Patentability (Chapter I or Chapter II of the Patent Cooperation Treaty) dated Jul. 11, 2019, issued for PCT/JP2017/043324.

(Continued)

*Primary Examiner* — Michael J Feely
(74) *Attorney, Agent, or Firm* — Locke Lord LLP; James E. Armstrong, IV; Nicholas J. DiCeglie, Jr.

(57) ABSTRACT

Provided is a resin composition that has satisfactory impregnability into reinforcing fibers due to low viscosity and small viscosity increase even in an impregnation process performed for a long time. The resin composition being suitable as a matrix resin for a fiber-reinforced composite material for producing a cured molded article that has toughness and fatigue resistance. The resin composition for a fiber-reinforced composite material includes an epoxy resin, an acid anhydride-based curing agent, an imidazole-based curing accelerator, a radically polymerizable monomer, and a radical polymerization initiator as essential components, has a viscosity at 25° C. that falls within a range of 50 mPa·s to 800 mPa·s as measured by an E-type viscometer, and exhibits a viscosity increase ratio of 200% or less after 8 h at 25° C., wherein 50% by mass or more of the acid anhydride-based curing agent is an alicyclic acid anhydride having no olefinic unsaturated bond.

9 Claims, No Drawings

(56) References Cited

FOREIGN PATENT DOCUMENTS

| WO | 2007/083715 A1 | 7/2007 |
| WO | 2017/057689 A1 | 4/2017 |

OTHER PUBLICATIONS

Translation of International Preliminary Report on Patentability (Chapter I of the Patent Cooperation Treaty) dated Jul. 2, 2019, for PCT/JP2017/043324, including Written Opinion dated Dec. 26, 2017.

* cited by examiner

CURABLE EPOXY RESIN COMPOSITION, FIBER-REINFORCED COMPOSITE MATERIAL AND MOLDED BODY USING SAME

TECHNICAL FIELD

The present invention pertains to a matrix resin composition for a fiber-reinforced composite material which is excellent in low viscosity and viscosity stability over a long time and which makes it possible to obtain a molded article having high heat resistance and toughness at the time of curing, and also to a fiber-reinforced composite material using the same and a molded body obtained by molding the same.

BACKGROUND ART

Fiber-reinforced composite materials are configured of reinforcing fibers such as glass fibers, aramid fibers, carbon fibers and the like and a thermally curable matrix resin such as an unsaturated polyester resin, a vinyl ester resin, an epoxy resin, a phenolic resin, a benzoxazine resin, a cyanate resin, a bismaleimide resin and the like. Since such composite materials are lightweight and excellent in mechanical properties such as strength, corrosion resistance, fatigue resistance and the like, they are widely used as structural materials for aircrafts, automobiles, civil engineering, sporting goods and the like.

Examples of methods for producing a fiber-reinforced composite material include an autoclave molding method and a press molding method using a prepreg obtained by impregnating reinforcing fibers in advance with a thermally curable matrix resin, a wet layup molding method including a step of impregnating reinforcing fibers with a liquid matrix resin and a step of molding by thermal curing, a liquid compression molding method, a pultrusion molding method, a filament winding molding method, an RTM method and the like. Among them, in the wet layup method, pultrusion molding method, filament winding molding method, and RTM method, a low-viscosity matrix resin is used in order to promptly impregnate the reinforcing fibers with the resin.

In addition, among these methods, in order to secure stable impregnating property in the wet layup molding method, pultrusion molding method and filament winding molding method, a matrix resin with a small viscosity increase ratio is used in the step of impregnating reinforcing fibers with the resin.

A tensile elongation at break of reinforcing fibers used in fiber-reinforced composite materials generally shows a value of 3% to 6% for glass fibers, 2% to 5% for aramid fibers, and 1.5% to 2.0% for carbon fibers. Therefore, from the standpoint of obtaining a fiber-reinforced composite material having excellent strength, it is desirable to use a material having a tensile elongation at break higher than that of the reinforcing fiber as the matrix resin.

Heretofore, thermosetting resins such as unsaturated polyester resins, vinyl ester resins and epoxy resins have been used in the wet layup molding method, pultrusion molding method and filament winding molding method. Although unsaturated polyester resins and vinyl ester resins having a radical polymerization property have low viscosity and excel in rapid curability, there is a problem that mechanical properties such as heat resistance, strength and toughness of molded articles are relatively low. Meanwhile, although an epoxy resin makes it possible to obtain a molded article having high heat resistance, strength and toughness, a problem associated therewith is that the resin viscosity is relatively high.

In PTL 1, a resin composition including an epoxy resin and an acid anhydride-based curing agent is used as a matrix resin to be used in a pultrusion molding method, and an application example thereof is suggested. Attempts have been made to achieve both a reduction in viscosity increase ratio and a rapid curability by using a specific curing accelerator. However, the matrix resin including an epoxy resin and an acid anhydride-based curing agent has a problem that the toughness of the cured product is low.

PTL 2 suggests a resin composition for a fiber-reinforced composite material having a lower viscosity as a result of using a bisphenol F-type epoxy resin of high purity. However, since a polyamine is used as a curing agent, a problem is associated with long-term viscosity stability.

PTL 3 and 4 describe reducing the viscosity of a resin composition by using an alicyclic epoxy resin or a reactive diluent such as an aliphatic glycidyl ether. Although an alicyclic epoxy resin makes it possible to obtain a low viscosity and a molded article having high heat resistance after curing, the problem is that toughness is low due to high crosslink density. Although a reactive diluent such as an aliphatic glycidyl ether reduced viscosity, a problem is a decrease in heat resistance of the cured product.

PTL 5 suggests a resin composition for a fiber-reinforced composite material that can be stored for a long time at room temperature and that exhibits high mechanical and physical properties in the obtained molded article as a result of using dicyandiamide as a curing agent. However, since the compounding viscosity is high and a solid material is used, a problem is in the impregnability into the reinforcing fibers.

In PTL 6 and 7, viscosity reduction is achieved by blending a radically polymerizable compound such as acrylic acid in addition to a resin composition composed of an epoxy resin and an acid anhydride or an amine-based curing agent. However, since a radically polymerizable compound including an acid group is used, a reaction of an epoxy group and a carboxyl group proceeds when all the components are mixed, so that viscosity rises due to the increase in molecular weight. The resultant problem is in the stability of impregnation over a long time.

Regarding a matrix resin for a fiber-reinforced composite material, although attempts have been made to improve impregnability and heat resistance of a molded article by lowering the viscosity of the resin composition, in addition thereto, further improvements in toughness, in particular tensile elongation of molded articles, are desired.

CITATION LIST

Patent Literature

[PTL 1] Japanese Patent No. 5028903
[PTL 2] Japanese Patent Application Publication No. 2004-285148
[PTL 3] Japanese Patent Application Publication No. 2013-1711
[PTL 4] Japanese Patent Application Publication No. 2014-167102
[PTL 5] WO 2004/048435
[PTL 6] Japanese Patent No. 4872139
[PTL 7] Japanese Patent No. 5397265

SUMMARY OF INVENTION

The present invention has an object to provide a resin composition that exhibits satisfactory impregnability into the reinforcing fibers, ensures high toughness of a molded article obtained by curing, and can be suitably used as a matrix resin for a fiber-reinforced composite material that makes it possible to obtain a molded article excellent in fatigue resistance.

As a result of studies conducted to solve the aforementioned problems, the inventors of the present invention have found that polymerization of a radically polymerizable monomer proceeds without being inhibited and a molded article having high heat resistance and toughness at the time of curing can be obtained by using an alicyclic acid anhydride having no olefinic unsaturated bond as an acid anhydride curing agent, thereby solving the above problems. The present invention has been accomplished on the basis of this finding.

That is, the present invention provides a resin composition for a fiber-reinforced composite material, comprising an epoxy resin (A), an acid anhydride-based curing agent (B), an imidazole-based curing accelerator (C), a radically polymerizable monomer (D), and a radical polymerization initiator (E) as essential components, having a viscosity at 25° C. that falls within a range of 50 mPa·s to 800 mPa·s as measured by an E-type viscometer, and exhibiting a viscosity increase ratio of 200% or less after 8 h at 25° C., wherein 50% by mass or more of the acid anhydride-based curing agent (B) is an alicyclic acid anhydride having no olefinic unsaturated bond.

It is preferable that the radically polymerizable monomer (D) be represented by a following general formula (1) and have a viscosity at 25° C. of 800 mPa·s or less as measured by an E-type viscometer.

[C1]

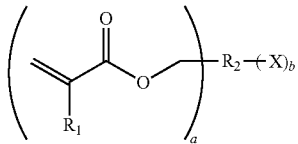

(1)

(wherein, $R_1$ independently represents a hydrogen atom or a methyl group, X represents a functional group selected from the group consisting of a hydroxyl group, a methoxy group, an ethoxy group, a nitrile group, a cyano group, and a halogen group; a represents 2 or 3; b represents 0 or 1; and $R_2$ represents a $C_2$-$C_{40}$ hydrocarbon group having a valence of a+b, which may have an ether-linked or ester-linked oxygen atom therein).

In the present invention, an amount of the radically polymerizable monomer (D) blended is more preferably 5 parts by mass to 25 parts by mass based on 100 parts by mass of the total amount of the component (A), component (B), component (C), component (D), and component (E).

Other aspects of the present invention pertain to a fiber-reinforced composite material in which a reinforcing fiber is blended with the resin composition for a fiber-reinforced composite material described above, and a molded body obtained by a wet layup molding method, a pultrusion molding method, or a filament winding molding method using the same.

The preferred volume content ratio of the reinforcing fibers in the fiber-reinforced composite material of the present invention is 50% by volume to 70% by volume.

The resin composition for a fiber-reinforced composite material of the present invention has low viscosity and small viscosity increase even in an impregnation step performed for a long time, exhibits satisfactory impregnability into reinforcing fibers, and makes it possible to obtain a molded article having high tensile elongation amount and a fracture toughness value at the time of curing.

DESCRIPTION OF EMBODIMENTS

Embodiments of the present invention will be described hereinbelow in detail.

The resin composition for a fiber-reinforced composite material of the present invention comprises an epoxy resin (A), an acid anhydride-based curing agent (B), an imidazole-based curing accelerator (C), a radically polymerizable monomer (D), and a radical polymerization initiator (E) as essential components. Hereinafter, the epoxy resin (A), the acid anhydride-based curing agent (B), the imidazole-based curing accelerator (C), the radically polymerizable monomer (D), and the radical polymerization initiator (E) will be referred to as component (A), component (B), component (C), component (D), and component (E), respectively.

The epoxy resin (A) used in the present invention can be exemplified by bisphenol epoxy resins such as bisphenol A type epoxy resin, bisphenol F type epoxy resin, bisphenol E type epoxy resin, bisphenol S type epoxy resin, bisphenol Z type epoxy resin, isophorone bisphenol type epoxy resin, and the like; halogen or alkyl substitution and hydrogenation products, high molecular-weight materials having not only monomers but also a plurality of repeating units, and glycidyl ethers of alkylene oxide adducts of these bisphenol epoxy resins; novolac epoxy resins such as phenol novolac epoxy resin, cresol novolac epoxy resin, bisphenol A novolac epoxy resin, and the like; alicyclic epoxy resins such as 3,4-epoxy-6-methylcyclohexylmethyl-3,4-epoxy-6-methylcyclohexane carboxylate, 3,4-epoxycyclohexylmethyl-3,4-epoxycyclohexane carboxylate, 1-epoxyethyl-3,4-epoxycyclohexane, and the like; aliphatic epoxy resins such as trimethylolpropane polyglycidyl ether, pentaerythritol polyglycidyl ether, polyoxyalkylene diglycidyl ether, and the like; glycidyl esters such as phthalic acid diglycidyl ester, tetrahydrophthalic acid diglycidyl ester, dimer acid glycidyl ester, and the like; and glycidyl amines such as tetraglycidyl diamino diphenyl methane, tetraglycidyl diamino diphenyl sulfone, triglycidyl aminophenol, triglycidyl aminocresol, tetraglycidyl xylylene diamine and the like. Among these epoxy resins, from the viewpoint of suppressing a viscosity increase ratio, an epoxy resin having two epoxy groups in a molecule is preferable, and a polyfunctional epoxy resin is not preferable. These resins may be used singly or in combination of two or more types thereof.

The acid anhydride-based curing agent (B) used in the present invention includes 50% by mass or more of an alicyclic acid anhydride having no olefinic unsaturated bond. When an alicyclic acid anhydride having an olefinic unsaturated bond is used, the polymerization of the radically polymerizable monomer is inhibited, and a molded article having high heat resistance and toughness at the time of curing cannot be obtained.

Specific suitable examples of the alicyclic acid anhydride having no olefinic unsaturated bond include hexahydrophthalic anhydride, methylhexahydrophthalic anhydride, hydrogenated methyl nadic anhydride, hydrogenated nadic anhydride, succinic anhydride, hydrogenated trimellitic anhydride, hydrogenated pyromellitic anhydride, cyclopentane tetracarboxylic acid dianhydride, and the like, and these may be used singly or, if necessary, in combination of two or more types thereof. More specifically, hexahydrophthalic anhydride, methylhexahydrophthalic anhydride, hydrogenated methyl nadic anhydride and the like are preferably used.

The acid anhydride-based curing agent (B) used in the present invention can include an alicyclic acid anhydride having an olefinic unsaturated bond, provided that the amount thereof is less than 50 parts by mass in 100 parts by mass of the component (B). For example, maleic anhydride, tetrahydrophthalic anhydride, methyltetrahydrophthalic anhydride, methyl nadic anhydride, nadic anhydride, trialkyltetrahydrophthalic anhydrides, methylcyclohexenetetracarboxylic acid dianhydride, dodecenyl succinic anhydride, and the like can be used. These may be used singly or, if necessary, in combination of two or more types thereof.

Similarly, an aromatic anhydride may be included, provided that the amount thereof is less than 50 parts by mass. For example, phthalic anhydride, trimellitic anhydride, pyromellitic anhydride, benzophenonetetracarboxylic acid dianhydride, ethylene glycol bisanhydrotrimellitate, glycerin bis(anhydrotrimellitate) monoacetate, and the like can be used. These may be used singly or in combination of two or more types thereof.

The amount of the acid anhydride-based curing agent (B) used is preferably such that the equivalent ratio of the acid anhydride groups in the acid anhydride-based curing agent (B) to the epoxy groups of the epoxy resin (A) [(acid anhydride groups)/(epoxy groups)] is 0.80/1.0 to 1.20/1.0. Here, 1 mole of anhydride group is calculated as 2 equivalents.

The amount of the imidazole-based curing accelerator (C) contained in the resin composition for a fiber-reinforced composite material of the present invention is preferably 0.01 parts by mass to 10 parts by mass, in particular 0.1 parts by mass to 3.0 parts by mass, with respect to 100 parts by mass of the acid anhydride-based curing agent (B). When the curing accelerator is contained in this range, a viscosity increase ratio at the time of mixing is low, and a molded article having high heat resistance at the time of thermal curing can be obtained.

As the imidazole-based curing accelerator (C), an imidazole-based compound such as 2-methylimidazole, 1,2-dimethylimidazole, 2-ethyl-4-methylimidazole, 1-benzyl-2-methylimidazole, 2-undecylimidazole, 2-heptadecylimidazole, 2-phenylimidazole, 2-phenyl-4-methylimidazole, 2-phenyl-4',5'-dihydroxymethylimidazole, 1-cyanoethyl-2-ethyl-4-methylimidazole, and the like may be used in order to obtain even better heat resistance at the time of curing, in addition to the impregnability into the reinforcing fibers at the time of mixing and suppression of viscosity increase ratio in the present invention.

As the radically polymerizable monomer (D), those having a polymerizable unsaturated bond can be used. Preferably, the monomer is a liquid at normal temperature which does not have an acid group such as a carboxyl group, a phosphoric acid group or a sulfonic acid group. Since these acid groups have reactivity with an epoxy group even at room temperature, the viscosity increase ratio of the molecular weight increases at the time of mixing with the epoxy resin, and stable impregnability into the fibers is impaired.

The preferred radically polymerizable monomer (D) is a monomer represented by the general formula (1) which has a viscosity at 25° C. of 800 mPa·s or less as measured by an E-type viscometer. Since two or more (meth)acryloyl groups are contained in a molecule, it is possible to obtain a molded article excellent in heat resistance and having a high cross-linking density at the time of thermal curing. Moreover, by using a radically polymerizable monomer having low viscosity, excellent impregnability into the reinforcing fibers is obtained.

In the general formula (1), $R_1$ is independently a hydrogen atom or a methyl group, X is a hydroxyl group, a methoxy group, an ethoxy group, a nitrile group, a cyano group, or a halogen; a is 2 or 3; and b is 0 or 1. $R_2$ is a $C_2$-$C_{40}$ hydrocarbon group having a valence of a+b, which may have an ether-linked or ester-linked oxygen atom therein. Examples of the $C_2$-$C_{40}$ hydrocarbon group, which may have an ether-linked oxygen atom, include hydrocarbon groups derived from polyalkylene glycols.

Specific suitable examples of the radically polymerizable monomer (D) include triethylene glycol diacrylate, polyethylene glycol 200 diacrylate, polyethylene glycol 300 diacrylate, polyethylene glycol 400 diacrylate, polyethylene glycol 600 diacrylate, polytetramethylene glycol diacrylate, neopentyl glycol diacrylate, 3-methyl-1,5-pentanediol diacrylate, 1,6-hexanediol diacrylate, 1,9-nonanediol diacrylate, dimethylol-tricyclodecane diacrylate, neopentyl hydroxypivalate glycol acrylic acid adduct, 2-hydroxy-3-acryloyloxypropyl methacrylate, trimethylolpropane triacrylate, pentaerythritol triacrylate, ethylene glycol dimethacrylate, diethylene glycol dimethacrylate, triethylene glycol dimethacrylate, polyethylene glycol 200 dimethacrylate, polyethylene glycol 300 dimethacrylate, polyethylene glycol 400 dimethacrylate, polyethylene glycol 600 dimethacrylate, 1,4-butanediol dimethacrylate, neopentyl glycol dimethacrylate, 1,6-hexanediol dimethacrylate, 1,9-nonanediol dimethacrylate, glycerin dimethacrylate, 2-hydroxy-3-acryloyloxypropyl methacrylate, trimethylolpropane trimethacrylate, and the like. These may be used singly or, if necessary, in combination of two or more types thereof. More specifically, triethylene glycol diacrylate, polyethylene glycol 200 diacrylate, polyethylene glycol 300 diacrylate, polyethylene glycol 400 diacrylate, polyethylene glycol 600 diacrylate and the like are preferable, and where these are used, a cured product or a molded article having higher toughness is obtained.

The amount of the radically polymerizable monomer (D) is 5 parts by mass to 25 parts by mass with respect to 100 parts by mass in total of the component (A), component (B), component (C), component (D), and component (E). Where the amount is less than 5 parts by mass, it is not preferable because the tensile elongation and the fracture toughness value are not improved. When the amount exceeds 25 parts by mass, the elastic modulus is lowered at the time of thermal curing, and a molded article having a low tensile strength and fracture toughness value is obtained. In addition, it is not preferable because the heat resistance also decreases.

Further, the radical polymerization initiator (E) is blended with the composition of the present invention in order to advance radical polymerization smoothly.

An azo compound which generates radicals on heating or organic peroxidation can be used as the radical polymerization initiator (E). Examples thereof include 2,2'-azobisisobutyronitrile, 1,1'-azobis(cyclohexane-1-carbonitrile), methyl ethyl ketone peroxide, methylcyclohexanone peroxide, methylacetoacetate peroxide, acetylacetone peroxide, 1,1-bis(t-butylperoxy) 3,3,5-trimethylcyclohexane, 1,1-bis(t-hexylperoxy)cyclohexane, 1,1-bis(t-hexylperoxy) 3,3,5-trimethylcyclohexane, 1,1-bis(t-butylperoxy) cyclohexane, 2,2-bis(4,4-di-t-butylperoxycyclohexyl)propane, 1,1-bis(t-butylperoxy)cyclododecane, n-butyl 4,4-bis(t-butylperoxy)

valerate, 2,2-bis(t-butylperoxy)butane, 1,1-bis(t-butylperoxy)-2-methylcyclohexane, t-butyl hydroperoxide, P-menthane hydroperoxide, 1,1,3,3-tetramethylbutyl hydroperoxide, t-hexyl hydroperoxide, dicumyl peroxide, 2,5-dimethyl-2,5-bis(t-butylperoxy)hexane, α,α'-bis(t-butylperoxy)diisopropylbenzene, t-butylcumyl peroxide, di-t-butyl peroxide, 2,5-dimethyl-2,5-bis(t-butylperoxy) hexyne-3, isobutyryl peroxide, 3,5,5-trimethylhexanoyl peroxide, octanoyl peroxide, lauroyl peroxide, cinnamic acid peroxide, m-toluoyl peroxide, benzoyl peroxide, diisopropyl peroxydicarbonate, bis(4-t-butylcyclohexyl) peroxydicarbonate, di-3-methoxybutylperoxy dicarbonate, di-2-ethylhexyl peroxydicarbonate, di-sec-butyl peroxydicarbonate, di(3-methyl-3-methoxybutyl) peroxydicarbonate, di(4-t-butylcyclohexyl) peroxydicarbonate, α,α'-bis (neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 2,5-dimethyl-2,5-bis(2-ethylhexanoylperoxy)hexane, 1,1,3,3-tetramethylbutyl peroxy-2-ethylhexanoate, 1-cyclohexyl-1-methylethylperoxy-2-ethylhexanoate, t-hexyl peroxy-2-ethylhexanoate, t-butyl peroxy-2-ethylhexanoate, t-butyl peroxyisobutyrate, t-butyl peroxymaleic acid, t-butyl peroxylaurate, t-butyl peroxy-3,5,5-trimethylhexanoate, t-butyl peroxyisopropyl monocarbonate, t-butyl peroxy-2-ethylhexyl monocarbonate, 2,5-dimethyl-2,5-bis(benzoylperoxy) hexane, t-butyl peroxyacetate, t-hexyl peroxybenzoate, t-butyl peroxy-m-toluoylbenzoate, t-butyl peroxybenzoate, bis(t-butylperoxy) isophthalate, t-butyl peroxyallylmonocarbonate, 3,3',4,4'-tetra (t-butylperoxycarbonyl)benzophenone and the like. In particular, the radical polymerization initiator (E) which is preferable for obtaining the effects of the present invention is a compound having a half-life temperature of 60° C. to 140° C. for 10 h, and more preferably a compound having a half-life temperature of 70° C. to 110° C. for 10 h. By using such compounds, the viscosity increase ratio at the time of mixing is suppressed, and a molded article excellent in heat resistance and toughness at the time of thermal curing can be obtained.

The amount of the radical polymerization initiator (E) contained in the resin composition for a fiber-reinforced composite material is preferably 0.005 parts by mass to 5.0 parts by mass, in particular 0.1 parts by mass to 2.0 parts by mass, with respect to 100 parts by mass of the radically polymerizable monomer (D). When the addition amount is less than 0.005 parts by mass, the curing degree of the radically polymerizable monomer decreases and the heat resistance and toughness of the molded article are impaired. When the addition amount exceeds 5.0 parts by mass, the curing rate of the radically polymerizable monomer becomes too high and the resin composition becomes high in the viscosity increase ratio, thereby impairing the stable impregnability into the fibers.

The resin composition for a fiber-reinforced composite material of the present invention is produced by uniformly mixing the above-mentioned components (A) to (E) and components added as needed. The obtained resin composition for a fiber-reinforced composite material has a viscosity at 25° C. of 50 mPa·s to 800 mPa·s as measured by an E-type viscometer (cone-plate type), whereby a satisfactory impregnability into the reinforcing fibers can be obtained and dripping of the resin from the fibers is unlikely to occur after the impregnation. Furthermore, the resin composition for a fiber-reinforced composite material of the present invention has a viscosity increase ratio of 200% or less after 6 h under the conditions of a temperature of 25° C. in the air atmosphere or inert gas atmosphere, thereby ensuring stable impregnability into the reinforcing fibers even in a molding method including an impregnating step performed for a long time, and making it possible to obtain a fiber-reinforced composite material with few voids at the time of curing.

Other curable resins can also be blended with the resin composition for a fiber-reinforced composite material of the present invention. Examples of such curable resins include unsaturated polyester resins, curable acrylic resins, curable amino resins, curable melamine resins, curable urea resins, curable cyanate ester resins, curable urethane resins, curable oxetane resins, curable epoxy/oxetane composite resin and the like, and these examples are not limiting.

The resin composition for a fiber-reinforced composite material of the present invention can be suitably used for a fiber-reinforced composite material obtained by a wet layup molding method, a pultrusion molding method, a filament winding molding method, or a transfer molding method.

Although the method for producing a fiber-reinforced composite material from the resin composition for a fiber-reinforced composite material of the present invention is not particularly limited, particularly preferable methods making it possible to obtain a fiber-reinforced composite material having high strength and few voids include a wet layup method in which fabrics of reinforcing fibers are arranged and laminated on a mold, a resin composition is applied, and then a cured molded body is obtained by heating and molding, a pultrusion method in which reinforcing fibers are continuously passed through an impregnation layer filled with a curable resin composition and then passed through a mold under heating to continuously obtain a rod-shaped molded article, a filament winding method in which reinforcing fibers are continuously passed through an impregnation layer filled with a curable resin composition and then wound around a mandrel, heated and molded to obtain a circularly cast hollow molded body, and a transfer molding method which involves loading into a transfer molding machine, heating and molding.

The reinforcing fibers to be used with the resin composition for a fiber-reinforced composite material of the present invention are selected from glass fibers, aramid fibers, carbon fibers, boron fibers and the like, but in order to obtain a fiber-reinforced composite material having excellent strength, carbon fibers are preferably used.

The volume content ratio of the reinforcing fibers in the molded body constituted by the resin composition for a fiber-reinforced composite material of the present invention and the reinforcing fibers is preferably 50% to 70% and more preferably in the range of 53% to 68%. Within this range, a molded body having few voids and a high volume content ratio of reinforcing fibers can be obtained, so that a molded material with excellent strength can be obtained.

EXAMPLES

Next, the present invention will be specifically described based on examples, but the present invention is not limited to the following examples, provided that the gist of the present invention is not impaired. Unless otherwise specified, the parts indicating the amount blended are parts by mass.

Abbreviations of the respective components used in the examples are as follows.

YD-128: bisphenol A type epoxy resin (manufactured by Nippon Steel & Sumikin Chemical Co., Ltd., viscosity (25° C.) 13,000 mPa·s)

YDF-170: bisphenol F epoxy resin (manufactured by Nippon Steel & Sumikin Chemical Co., Ltd., viscosity (25° C.) 2500 mPa·s)
MHH: methyl hexahydrophthalic anhydride (acid anhydride group equivalent 168, viscosity (25° C.) 61 mPa·s)
MH700: a mixture of hexahydrophthalic anhydride/methyl hexahydrophthalic anhydride in a ratio of 30/70
HNMA: hydrogenated methyl nadic anhydride (acid anhydride group equivalent weight 180, viscosity (25° C.) 330 mPa·s)
MTH: methyltetrahydrophthalic anhydride (acid anhydride group equivalent 166, viscosity (25° C.) 53 mPa·s)
EMZ: 2-ethyl-4-methylimidazole
DMZ: 1,2-dimethylimidazole
PEGDA: polyethylene glycol 200 diacrylate (viscosity (25° C.) 13 mPa·s)
DPEHA: dipentaerythritol hexaacrylate (viscosity (25° C.) 4,000 mPa·s)
BPO: benzoyl peroxide
tBuPOB: t-butyl peroxybenzoate Example 1

A total of 43 parts of YD-128 as the component (A), 39 parts of MHH as the component (B), 0.2 parts of DMZ as the component (C), 17 parts of PEGDA as the component (D), and 0.1 part of tBuPOB as the component (E) were placed in a 150 mL polymer container and mixed under stirring at room temperature for 5 min by using a vacuum mixer "AWATORI RENTARO" (THINKY Corp.) to obtain a resin composition for a fiber-reinforced composite material.

Preparation of Test Piece for Measuring Glass Transition Temperature

This resin composition for a fiber-reinforced composite material was poured into a die having a length of 80 mm and a width of 80 mm and provided with a 4 mm thick spacer hollowed out into a flat plate shape, cured at 100° C. for 1 h and then at 120° C. for 3 h, cut to a size of 50 mm×10 mm by using a table band saw and used for measurement of the glass transition temperature.

Preparation of Tensile Test Piece

The resin composition for a fiber-reinforced composite material was poured into a die having a length of 180 mm and a width of 180 mm and provided with a spacer hollowed out into a dumbbell shape, and cured at 100° C. for 1 h and then at 120° C. for 3 h to prepare a test piece to be subjected to a tensile test. Test piece conformed to a 1B-type test piece described in JIS 7161-2.

Preparation of Test Piece for Fracture Toughness Measurement

The resin composition for a fiber-reinforced composite material was poured into a die having a length of 180 mm and a width of 180 mm and provided with a spacer hollowed out into a rectangular parallelepiped shape, and cured at 100° C. for 1 h and then at 120° C. for 3 h to prepare a test piece conforming to ASTM D5045-91.

Examples 2 to 12 and Comparative Examples 1 to 5

Resin compositions for fiber-reinforced composite materials were prepared under the same mixing conditions as in Example 1 except that the raw materials were used in the compositions described in Table 1 and Table 2 as the components (A) to (E). Test pieces to be used for the tensile test, measurement of fracture toughness and measurement of glass transition temperature were prepared in the same manner as in Example 1.

Measurement of Initial Viscosity, Viscosity After 8 h and Viscosity Increase Ratio The value of viscosity at 25° C. was measured using an E-type viscometer of a cone plate type. A total of 1.1 mL of the resin composition for a fiber-reinforced composite material was used for measurement, and the value after 60 sec from the start of measurement was taken as the value of initial viscosity. Further, after the resin composition for a fiber-reinforced composite material was allowed to stand for 8 h in a constant-temperature water bath set at 25° C., the viscosity was similarly measured using an E-type viscometer of a cone plate type, and the value after 60 sec from the start of measurement was taken as the value after 8 h. The viscosity increase ratio was calculated using the formula of 100×(viscosity after 8 h/initial viscosity).

Measurement of Glass Transition Temperature (Tg)

Using a dynamic viscoelasticity tester, the measurement was performed on a test piece for glass transition temperature measurement under conditions of a heating rate of 5° C./rain, a bending mode, and a measuring frequency of 10 Hz, and the maximum value of a loss elastic modulus (E") was taken as a glass transition temperature.

Measurement of Tensile Elongation at Break

Using an autograph AGS-X (manufactured by Shimadzu Corporation), a tensile test piece was measured according to the method conforming to JIS 7161-2, and the tensile elongation at break was determined from the amount of displacement at the time of breakage of the test piece.

Measurement of Fracture Toughness Value

Using an autograph AGS-X (manufactured by Shimadzu Corporation), an initial crack was generated on a 3-point bending test piece by using a razor blade in accordance with ASTM D5045-91, and a compressive load was applied to cause crack propagation. The fracture toughness value was calculated from the load at the time the test piece was fractured.

The results of the tests are shown in Tables 1 and 2.

TABLE 1

| Examples | 1 | 2 | 3 | 4 | 5 | 6 | 7 | 8 | 9 |
|---|---|---|---|---|---|---|---|---|---|
| YD-128 | 43 | 41 | 49 |  | 43 | 43 | 44 | 42 | 43 |
| YDF-170 |  |  |  | 42 |  |  |  |  |  |
| MHH | 39 | 37 | 44 | 42 | 39 | 39 |  |  | 26 |
| MH700 |  |  |  |  |  |  | 38 |  |  |
| HNMA |  |  |  |  |  |  |  | 41 |  |
| MTH |  |  |  |  |  |  |  |  | 13 |
| DMZ | 0.2 | 0.2 | 0.2 | 0.2 |  | 0.2 | 0.2 | 0.2 | 0.2 |
| EMZ |  |  |  |  | 0.2 |  |  |  |  |
| PEGDA | 17 | 22 | 6 | 17 | 17 | 17 | 18 | 17 | 17 |
| tBuPOB | 0.1 | 0.1 | 0.1 | 0.1 | 0.1 |  | 0.1 | 0.1 | 0.1 |
| BPO |  |  |  |  |  | 0.1 |  |  |  |

TABLE 1-continued

| Examples | 1 | 2 | 3 | 4 | 5 | 6 | 7 | 8 | 9 |
|---|---|---|---|---|---|---|---|---|---|
| Initial viscosity (mPa/s) | 259 | 163 | 452 | 196 | 247 | 263 | 320 | 473 | 263 |
| Viscosity after 8 h (mPa/s) | 390 | 243 | 838 | 298 | 379 | 411 | 483 | 792 | 410 |
| Viscosity increase ratio (%) | 151 | 149 | 185 | 152 | 153 | 156 | 151 | 167 | 156 |
| Tg (° C.) | 126 | 118 | 138 | 120 | 125 | 126 | 130 | 133 | 117 |
| Tensile elongation at break (%) | 7.9 | 8.3 | 5 | 7 | 7.2 | 7.3 | 6.1 | 5.3 | 5.6 |
| Fracture toughness (MPa/m$^{0.5}$) | 1.1 | 1.1 | 1.0 | 1.1 | 1.1 | 1.1 | 1.1 | 1.1 | 1.1 |

TABLE 2

| Examples | 10 | 11 | 12 | Comp. 1 | Comp. 2 | Comp. 3 | Comp. 4 | Comp. 5 |
|---|---|---|---|---|---|---|---|---|
| YD-128 | 43 | 38 | 51 | 52 | | 43 | 43 | 43 |
| YDF-170 | | | | | 50 | | | |
| MHH | 39 | 35 | 46 | 47 | 50 | | 13 | 39 |
| MTH | | | | | | 39 | 26 | |
| DMZ | 0.2 | 0.2 | 0.3 | 0.3 | 0.2 | 0.2 | 0.2 | 0.2 |
| PEGDA | | 27 | 4 | | | 17 | 17 | |
| TMPTA | 17 | | | | | | | |
| DPEHA | | | | | | | | 17 |
| tBuPOB | 0.1 | 0.1 | 0.1 | | | 0.1 | 01 | 0.1 |
| Initial viscosity(mPa/s) | 533 | 161 | 422 | 823 | 654 | 263 | 253 | 6530 |
| Viscosity after 8 h (mPa/s) | 1038 | 243 | 738 | 1194 | 892 | 411 | 418 | 15360 |
| Viscosity increase ratio (%) | 195 | 151 | 175 | 145 | 136 | 156 | 165 | 235 |
| Tg (° C.) | 133 | 111 | 139 | 167 | 153 | 101 | 114 | 140 |
| Tensile elongation at break (%) | 4.9 | 5.3 | 4.3 | 2.6 | 2.4 | 3.8 | 2.9 | 1.9 |
| Fracture toughness (MPa/m$^{0.5}$) | 1.0 | 0.8 | 0.9 | 0.6 | 0.6 | 0.6 | 0.7 | 0.5 |

INDUSTRIAL APPLICABILITY

The resin composition for a fiber-reinforced composite material of the present invention can be suitably used particularly for a fiber-reinforced composite material obtained by a wet layup molding method, a pultrusion molding method, or a filament winding molding method.

The invention claimed is:

1. A resin composition for a fiber-reinforced composite material, comprising an epoxy resin (A), an acid anhydride-based curing agent (B), an imidazole-based curing accelerator (C), a radically polymerizable monomer (D), and a radical polymerization initiator (E) as essential components, having a viscosity at 25° C. that falls within a range of 50 mPa·s to 800 mPa·s as measured by an E-type viscometer, and exhibiting a viscosity increase ratio of 200% or less after 8 h at 25° C., wherein 50% by mass or more of the acid anhydride-based curing agent (B) is an alicyclic acid anhydride having no olefinic unsaturated bond; wherein the radically polymerizable monomer (D) is represented by a following general formula (1) and has a viscosity at 25° C. of 800 mPa·s or less as measured by an E-type viscometer,

[C1]

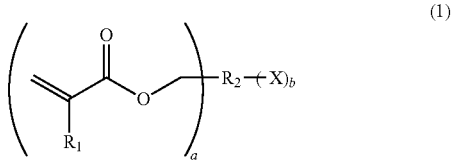

wherein, $R_1$ independently represents a hydrogen atom or a methyl group, X represents a functional group selected from the group consisting of a hydroxyl group, a methoxy group, an ethoxy group, a nitrile group, a cyano group, and a halogen group; a represents 2 or 3; b represents 0 or 1; and $R_2$ represents a $C_6$-$C_{40}$ hydrocarbon group having a valence of a+b, which have an ether-linked or ester-linked oxygen atom therein.

2. The resin composition for a fiber-reinforced composite material according to claim 1, wherein an amount of the radically polymerizable monomer (D) blended is 5 parts by mass to 25 parts by mass based on 100 parts by mass of the total amount of the component (A), component (B), component (C), component (D), and component (E).

3. A fiber-reinforced composite material obtained by blending a reinforcing fiber with the resin composition for a fiber-reinforced composite material according to claim 2.

4. The fiber-reinforced composite material according to claim 3, wherein a volume content ratio of the reinforcing fibers in the fiber-reinforced composite material is 50% by volume to 70% by volume.

5. A wet layup molded body, a pultrusion molded body, or a filament winding molded body of the fiber-reinforced composite material according to claim 4.

6. A wet layup molded body, a pultrusion molded body, or a filament winding molded body of the fiber-reinforced composite material according to claim 3.

7. A fiber-reinforced composite material obtained by blending a reinforcing fiber with the resin composition for a fiber-reinforced composite material according to claim 1.

8. The fiber-reinforced composite material according to claim 7, wherein a volume content ratio of the reinforcing fibers in the fiber-reinforced composite material is 50% by volume to 70% by volume.

9. A wet layup molded body, a pultrusion molded body, or a filament winding molded body of the fiber-reinforced composite material according to claim 7.

\* \* \* \* \*